June 26, 1956  D. W. FINLAY ET AL  2,751,990
AIRPLANE GROUND TUG
Filed Nov. 13, 1950  2 Sheets-Sheet 1
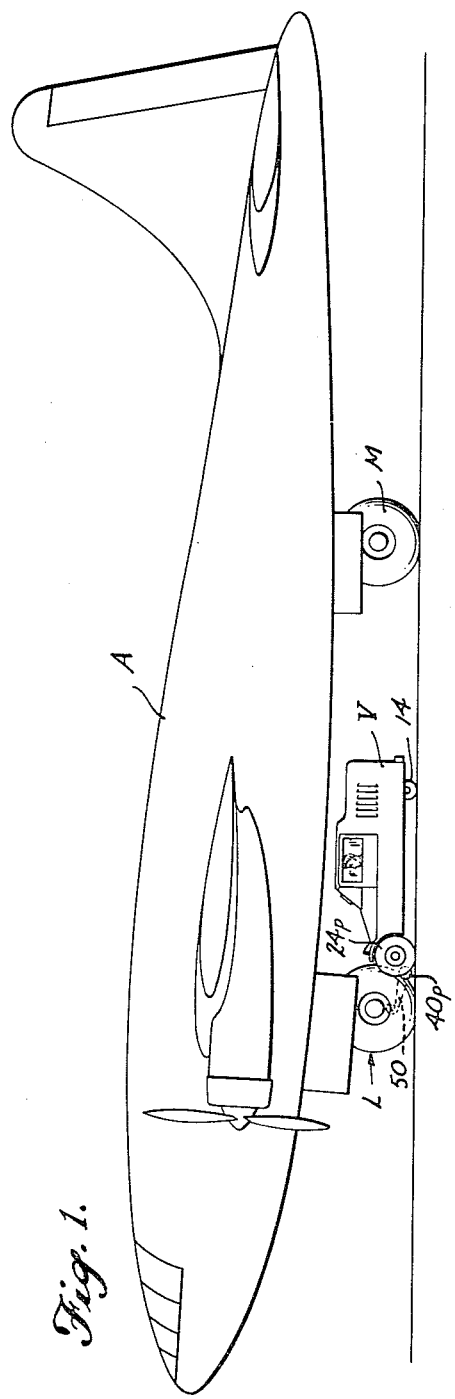
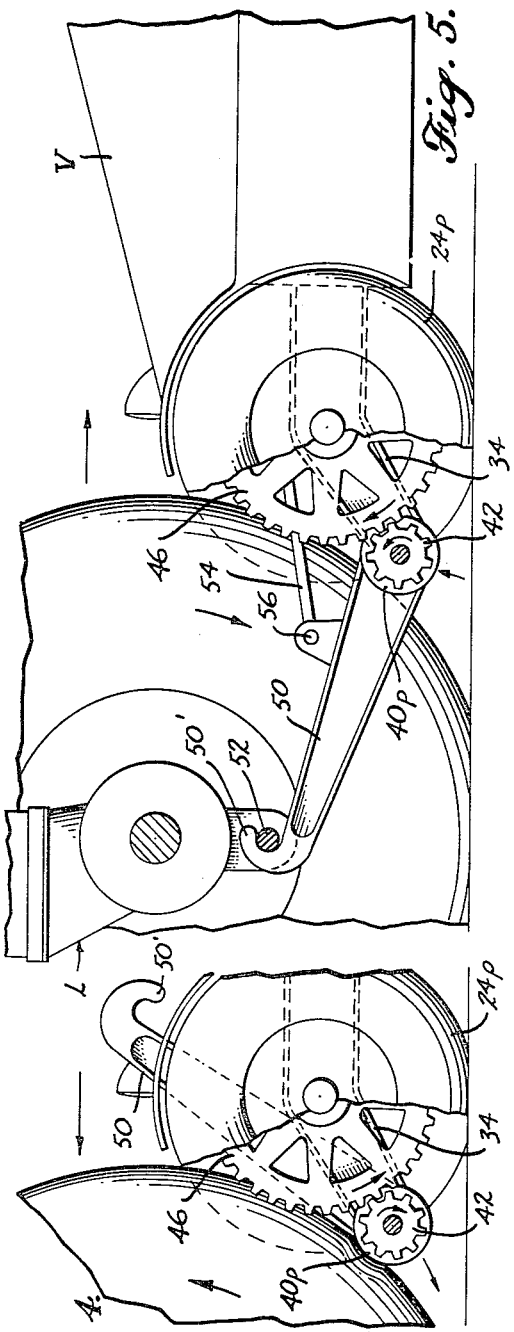
INVENTOR.
DONALD W. FINLAY
RAYMOND E. PEARSON
BY
Reynolds, Beach & Christensen
ATTORNEYS June 26, 1956 D. W. FINLAY ET AL 2,751,990
AIRPLANE GROUND TUG
Filed Nov. 13, 1950 2 Sheets-Sheet 2
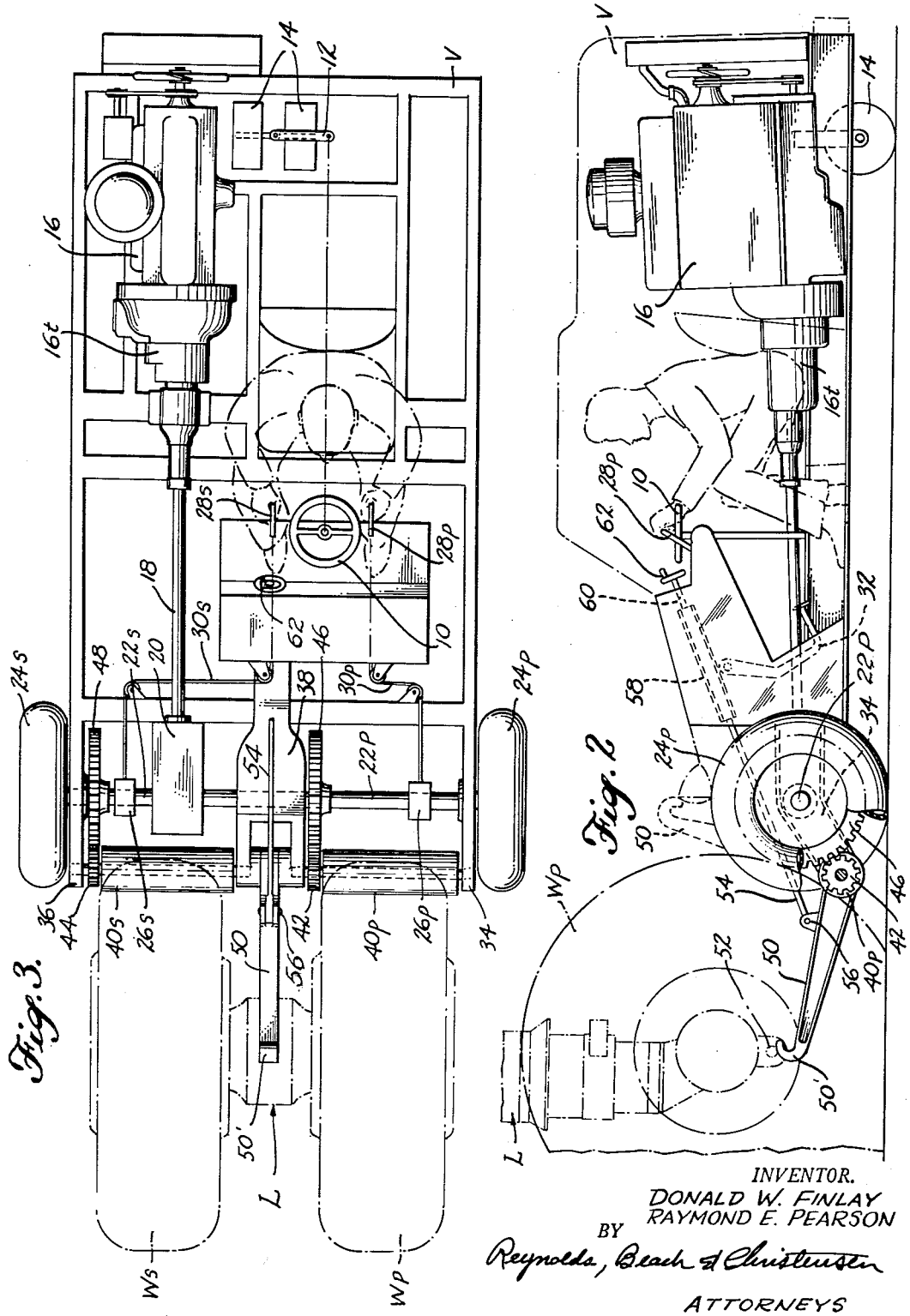
INVENTOR.
DONALD W. FINLAY
RAYMOND E. PEARSON
BY
Reynolds, Beach & Christensen
ATTORNEYS

United States Patent Office 2,751,990
Patented June 26, 1956

2,751,990

AIRPLANE GROUND TUG

Donald W. Finlay and Raymond E. Pearson, Seattle, Wash., assignors to Boeing Airplane Company, Seattle, Wash., a corporation of Delaware Application November 13, 1950, Serial No. 195,208

7 Claims. (Cl. 180—6.2)

This invention relates to a tug or similar vehicle for moving heavy airplanes on the ground, and more particularly to a self-powered device for that purpose which operates by applying rotational torque to the landing wheels directly in order to move the airplane, and is thereby distinguished from conventional tug vehicles which simply tow or push the airplane by their own tractive effort on the ground. Among other differences the tug vehicle is distinguished from railroad car hand-operated movers or the like employing torque wheels, in that it permits moving an airplane either forward or backward by use of torque-producing power friction rolls applied to the landing wheels at a given location thereon, whereas the railroad car movers referred to are limited to forward movement only.

One difficulty experienced with conventional tugs which fall in the category mentioned above is that they must be very large and heavy if adequate traction on the ground is to be obtained for moving very large airplanes, especially under slippery runway conditions. Another limitation of such prior tug vehicles which is often serious is lack of maneuverability permitting large airplanes, especially those of the dual wheel central landing gear type, to be steered conveniently by the tug and to be moved either backward or forward thereby in a given or single position of the tug relative to the airplane. Furthermore, under the heavy traffic conditions of modern airports the time required to effect coupling and decoupling a conventional tug to and from the airplane for towing purposes is often objectionable, it being generally desirable to be able to move airplanes to and from runways in a minimum length of time.

A general object of the present invention is the overcoming of these and similar limitations of prior conventional airplane ground tugs, and to provide an improved tug vehicle, capable of rapid and convenient operation to move an airplane effectively in any desired manner under all conditions which may be encountered.

A more specific object is an improved tug vehicle of the type indicated capable of moving the heaviest of airplanes, although such vehicle be of relatively lightweight construction. A related object is an efficient tug vehicle of this type which can be of lightweight construction and compact, hence relatively inexpensive to manufacture and easy to handle and store.

Another object is such a tug vehicle which cooperates with the airplane in such a way that the operations of engaging and disengaging the same are very quickly executed, and the operations of moving the airplane forward or backward involve the same initial approach or positioning of the tug vehicle with relation to the airplane landing gear. A related object is to permit such engagement and disengagement to be accomplished without the aid of an assistant or necessity for the tug vehicle operator to disembark from the tug vehicle in order to execute these operations. A further desirable feature is that the arrangement requires no complex or bulky coupling mechanism to be carried by the landing gear for the purposes at hand.

The invention is applied to best advantage in the case of a tug vehicle adapted for moving heavy airplanes of the type incorporating a dual wheel central landing gear which usually carries a major portion of the airplane weight load, and suitable outboard landing gear which provide lateral stability. The improved tug vehicle is herein illustratively described by reference to that application of the invention, in which provisions for effecting steering of the airplane by the tug in a convenient manner are of special importance, but it should be understood that certain features thereof, especially those which are more fundamental to the solution afforded by the invention to the general problem of moving heavy airplanes on the ground, may be used to advantage in other forms and for moving other types of airplanes or indeed other wheeled vehicles.

In its herein illustrated form the improved tug vehicle carries at one end thereof a pair of power friction rolls which turn about a common horizontal axis transverse to the vehicle, and are spaced apart endwise along such axis each to squarely engage the periphery of one of the wheels of the central dual wheel landing gear, respectively. Such power rolls are carried by the tug vehicle at a level fairly near the ground, that is well below the height of the airplane landing wheel axis. As a result when the tug vehicle is advanced to press its power rolls against the respective landing wheels, and the rolls themselves are then rotated in a direction opposite to rotation of the tug vehicle's own drive wheels, progressive wedging of the power rolls under the landing wheels takes place. This wedging action results mainly from the tractive effort of the revolving power rolls on the tire peripheries tending to run such rolls downward along the tire contour, and is, of course, partly attributed to the forward thrust imparted to the rolls by the tug vehicle itself. As these power rolls tend to wedge progressively beneath the landing wheel tires, their pressure and surface area of contact with such tires correspondingly increases and greater traction is obtained. This in turn produces greater wedging and the action is cumulative until finally sufficient traction by the rolls is gained on the tire peripheries to rotate the landing wheels directly by virtue of rotational torque imparted by the rolls. The airplane then moves ahead and continues to do so as long as the tug vehicle is maintained, as by its own rotating drive wheels in the described relationship with the landing wheels.

Steering is accomplished preferably by controlling the power delivered to each power roll separately in order to rotate one of the landing gear wheels faster than the other and thereby produce turning of the landing gear as a whole. In the preferred and herein illustrated form of the invention this separate control of the power rolls is effected by driving such rolls through a differential transmission and applying separately controlled braking force to the two output branches of the differential connected to the respective power rolls.

Further important features of the invention reside in the mechanism by which the power rolls carried by the tug vehicle are enabled to effect reverse rotation of the landing wheels to cause the airplane to move backward without materially shifting the position of the tug vehicle relative to the landing gear engaged thereby. In accordance with the invention such reverse rotation of the landing wheels engaged by the power rolls is accomplished by reversing the direction of rotation of the rolls from that previously described and maneuvering the tug vehicle in the same manner as before to press the rolls into engagement with the landing wheels by the thrust of the tug vehicle. In this case, however, a link extending forward from the tug vehicle beyond the rolls is coupled to a suitable pivot element carried by the landing gear at a location thereon offset from the axis of rotation of the landing wheels, preferably directly below the landing gear axle and between its wheels. This pivot location is such that the resulting general arc of upward swing of the power rolls on the link about such pivot element intersects the periphery circle of the landing wheel tires at an acute angle on the side of said tires facing the tug vehicle. Thus when the reversely driven power rolls tend by friction to climb up the sides of the landing wheels they are constrained by the link to wedge progressively more firmly against the tire peripheries and thereby increase their own traction thereon, which in turn permits them to climb further and continue the progressive wedging action. When such traction becomes great enough, instead of the power rolls climbing further up the tires the landing wheels themselves are rotated by the power rolls as desired.

It will be noted that in the case of forward drive operation the ground itself provides the translational guide for the rolls constraining them in a path producing progressive wedging thereof against the landing wheels and cumulative increase of traction therebetween. However, in the case of reverse or backward drive operation the pivoted link connected to the landing gear provides the translational guide for the rolls producing the desired progressive wedging action thereof against the landing wheels.

The ability of the landing wheel tires to yield resiliently and conform to the roll contour increasingly as the wedging action progresses is a material factor in obtaining the necessary frictional grip of the rolls against the wheels for moving a heavy airplane.

Although during reverse drive operation of the tug vehicle engaged with the airplane, the front end of such vehicle may actually tend to rise from the ground as its power rolls run up the landing wheel tires the necessary distance for gaining traction sufficient to rotate such wheels, this effect does not materially reduce the ability of the tug vehicle to move the airplane. Indeed, its weight on the ground, hence its tractive effort on the ground is entirely secondary to the propulsion effort produced by the wedging power rolls.

These and other features, objects and advantages of the invention including certain details of the preferred form thereof will become more fully evident from the following description, based upon the accompanying drawings.

Figure 1 is a side elevation view illustrating generally the normal operating position of the tug vehicle with relation to an airplane to be moved thereby.

Figure 2 is a side elevation view of the tug vehicle illustrating the principal components thereof and the manner of maneuvering the tug vehicle into operative engagement with the airplane landing gear.

Figure 3 is a corresponding plan view of the same.

Figure 4 is an operating view of the forward end portion of the tug vehicle engaging the landing wheels to effect rotation thereof in the forward moving sense, as indicated by the arrows.

Figure 5 is a similar operating view of the forward portion of the tug vehicle engaged with the landing gear to effect reverse rotation and backward movement thereof, as indicated by the arrows.

As shown in Figures 1 and 3, the landing carriage of airplane A includes the forward dual wheel central landing gear L, the cooperating aft dual wheel central landing gear M and suitable outboard landing gear elements (not shown) affording lateral stability to the airplane. The two landing gears L and M and particularly the forward landing gear L carry a major portion of the total load presented by the airplane. For this reason and because the landing gear L is located somewhat ahead of the center of gravity, it is customarily used for steering the airplane on the ground. Accordingly, it thereby affords the most suitable landing gear of the composite landing carriage, by which to effect ground movement of such airplane with the tug vehicle as herein described.

In the normal intended mode of operation of the novel tug vehicle V in moving an airplane of this general type, such main landing gear L is approached by the tug vehicle from the rear and along a line in the vertical central plane of such landing gear. During this approach movement of the tug vehicle and in other independent ground maneuvers thereof, it is ordinarily steered by means of the steering wheel 10 connected through a suitable linkage (not shown) to a steering lever 12 which turns the close-set rear wheels 14 of the tug vehicle (Figure 3). Preferably the tug vehicle is of the front-wheel drive type, and includes the engine 16, drive shaft 18 and the differential power transmission 20 operatively connecting such drive shaft with each of the drive axles 22p and 22s, upon which the respective front wheels 24p and 24s are rotatively mounted for propelling the vehicle. Suitable brakes 26p and 26s controlled by operator's levers 28p and 28s through control cables 30p and 30s, respectively, cooperate with shafts 22p and 22s for enabling the operator to vary the speed of one such shaft relative to the other, which is permitted because of the action of the differential 20. Such brakes provide a novel means by which the tug vehicle and airplane may both be steered while moving the airplane.

It will be understood, of course, that the tug vehicle is provided with a suitable throttle to control delivery of fuel to the engine and thereby the power which it develops, a suitable foot brake 32, a reversible drive transmission 16t and other or more obvious components which may be considered necessary or convenient in a vehicle of this general nature. The specific details and the general form and appearance of the vehicle as such are not directly of interest for present purposes.

With reference to Figures 2 and 3, the vehicle frame has forwardly extending side members 34 and 36 and a corresponding forwardly extending central member 38. The transversely aligned drive axles 22p and 22s are journaled in these members and are of such combined length that the vehicle drive wheels 24p and 24s are carried by their outer ends far enough apart to straddle the airplane landing gear L when the vehicle is positioned as in Figure 3. The opposite frame side members 34 and 36 themselves are also separated by a distance preferably equal to or slightly greater than the over-all width of such landing gear, with the central frame member 38 being located substantially mid-way between such side members and of a width to be received between the dual landing wheels as shown.

In the vicinity of the drive axle journals, the three members 34, 36 and 38 are turned downward at an appreciable acute angle to locate their forward lower end portions at a height not far above ground and well below the height of the landing wheel axis. A rubber-faced power friction roll 40p is journaled rotatively by and between the forward end portions of the side member 34 and central member 38 while a similar roll 40s is likewise journaled between the members 36 and 38 with the axes of such rolls transversely aligned and horizontal. The length of each power roll is made at least substantially equal to the width of a landing wheel tire, and the roll spacing equal to the tire spacing, so that when the rolls are pressed squarely against such tire the area of contact therewith will be a maximum.

The two power rolls 40p and 40s have supporting drive shafts upon which the respective drive pinions 42 and 44 are mounted. The pinion 42 meshes with the large drive gear 46 keyed on drive axle 22p, whereas the drive pinion 44 meshes with the corresponding large drive gear 48 keyed on drive axle 22s. Preferably the outside diameter of the power rolls is considerably less than the outside diameter of the front drive wheels 24p and 24s of the tug vehicle, being about one-fourth the diameter of the latter in the illustrative case. In order to establish a power roll peripheral velocity which approximates the peripheral velocity of the front drive wheels of the tug vehicle, or the ground velocity of such vehicle, the drive ratio between drive gears 46, 48 and respective drive pinions 42, 44 is made approximately equal to the ratio of the vehicle drive wheel and power roll diameters.

In order to engage the airplane landing gear L operatively, whether for forward or backward movement thereof, the tug vehicle first is maneuvered into the position shown in Figures 2 and 3, and is urged ahead under power applied through its own front drive wheels 24p, 24s, to thrust the power rolls 40p and 40s firmly against the airplane tires Wp and Ws, respectively. Upon accomplishment of this initial positioning operation if the airplane is to be moved ahead by the tug vehicle, the drive shaft 18 will be rotated in such a direction that the power rolls both tend to roll downward on the engaged peripheral surface of the airplane tires, as indicated by the directional arrows in Figure 4. Being carried relatively near the ground, that is well below the height of the airplane wheel axis, the small rotating power rolls, because they are thrust horizontally against the tires by the tug vehicle and tend of their own tractive effort to roll down such tires, tend to wedge progressively further under the landing wheels. As a result of their progressive wedging action beneath the tire contour, they impose a greater downward load upon the front drive wheels 24p and 24s of the tug vehicle; moreover, they become pressed more firmly against the airplane tires. As a result both the area and the pressure of contact between such power rolls and the airplane tires increase cumulatively until finally the point is reached at which roll traction is great enough to turn the landing wheels and the airplane is moved thereby.

The landing wheels continue to be rotated in the desired direction in this manner as long as the tug vehicle operator maintains the power rolls against the landing wheels. This follow-up movement of the vehicle as the landing gear moves ahead of it, however, is readily accomplished or is inherent because the tug vehicle drive wheels 24p and 24s are rotated conjointly with the power rolls in a direction to advance the tug vehicle at a speed at least equal to the ground speed which the power rolls impart to the airplane landing wheels.

In order to steer the airplane without disturbing the engagement of the power rolls with the airplane landing wheels, one or the other of brakes 26s and 26p are actuated by the operator to retard one or the other of the drive axles 22p or 22s, hence the corresponding drive wheel and power roll. The other such wheel and power roll is then automatically speeded up by a corresponding amount because of the action of the differential 20. As a result the airplane landing wheels engaged by the rolls are slowed down and speeded up by similar amounts, and the landing gear and tug vehicle engaged therewith turn together. A turn in the opposite sense is executed simply by applying the alternate brake so that the alternate drive axle is retarded and the speed of the other correspondingly increased. Clearly other power drive systems may be employed to rotate the vehicle drive wheels and corresponding power rolls at differential speeds in controlled manner for accomplishing the steering operation.

In order to move the airplane backward or in the reverse sense the tug vehicle is provided with a link 50 carried by the forward end of the central frame member 38 to pivot on a horizontal axis which, in the illustrated case coincides with the rotational axis of rolls 40p and 40s. Normally and for airplane-forward moving operations the link 50 is swung upward into its retracted position shown by dotted lines in Figure 2 and is not used. However, for moving the airplane backward the link 50 is first lowered into its solid line position shown in Figure 2 until its swinging end forming the hook 50′ will pass below the landing wheel horizontal lug 52 as the tug vehicle advances to press the power rolls against and into the landing gear tires. Thereupon the link is raised slightly until, upon slight backing off of the tug vehicle accomplished by resilient reaction of the temporarily deformed tires pressing on the power rolls, the hook portion 50′ becomes secured around the lug 52 (Figure 5). Preferably the length of the link between its axis of pivot and its hook end 50′ is such that when the hook engages the lug 52 the power rolls 40p and 40s still remain in contact with the landing wheel tires.

Although various devices may be employed to raise and lower the link 50 in the manner indicated, the simple draw bar arrangement, including the draw bar 54 pivotally connected by a pin 56 to an offset portion on the link 50 is suitable. The upper end of this draw bar is connected to the member 58 which forms a traveling nut threadedly engaged by an actuating screw 60 which the operator rotates by means of the handle 62 for raising and lowering the link.

After the lug 52 is engaged by the hook portion of the link in the manner described, the operator reverses the direction of rotation of the vehicle's drive shaft 18, and thereby reverses the sense of rotation of the power rolls and also of the vehicle's drive wheels. This is indicated by the directional arrows in Figure 5, from which it will be seen that the tendency now is for the power rolls to run up the peripheries of the respective landing wheel tires. The location of lug 52 relative to the landing wheel axis, and the effective length of the link 50 pivoted on the lug by hook 50′ is such that, as the rolls run upward by traction on the landing wheel tires they are constrained to follow a circular arc trajectory which intersects the tire periphery circle generally at an acute angle, such that the ascending rolls wedge progressively inward against the tires. Accompanying this progressive wedging action of the rolls the increasing pressure and area of contact therewith the tires ultimately provides sufficient tractive effort of the rolls to rotate the landing wheels in the direction which produces backward movement of the airplane. This is true despite the fact that upward movement of the rolls on the tires tends to raise the front end of the tug vehicle from the ground, or at least to diminish the weight which it imposes on its drive wheels, hence diminishes the tractive effort of the latter on the ground. The tractive effort of the vehicle on the ground, however, is secondary to the tractive effort between the power rolls and the airplane landing wheels in moving the airplane, as previously mentioned.

In the case of forward moving operations, therefore, the ground surface itself becomes a translational guide by which the rolls are constrained to follow a path causing them to wedge progressively against the airplane wheels and gain the necessary traction thereon to rotate such wheels. In the backward moving operations, however, the link 50 or its equivalent pivoted on the lug 52 or equivalent anchor point on the airplane becomes the reference or guide constraining the reversely rotating rolls to wedge progressively against the landing wheels. In neither case is it essential that the tug vehicle itself be so heavy or so constructed that its own tractive effort on the ground is sufficient to move the airplane, but on the contrary the tug vehicle may be of relatively lightweight construction and theoretically may rely wholly upon the progressive wedging action of the power rolls against the landing wheels for providing the necessary tractive effort to rotate the latter in the desired direction.

In executing backward moving operations it will be appreciated that the same mode of steering the airplane as in the case of forward moving operations is used, namely by the selective application of the brakes 26p and 26s to retard one or the other of the power axles 22p or 22s in accordance with the direction of turning desired.

We claim as our invention:

1. In combination, a wheeled vehicle to be moved including a wheel support means and a wheel carried by said wheel support means, a tug vehicle operable to effect ground movement of said wheeled vehicle, said tug vehicle including a power friction roll, means supporting said power friction roll on one end of said tug vehicle to rotate about an axis extending horizontally and transversely of said tug vehicle and enabling said roll to engage the periphery of said wheel in rolling contact, power means operable to rotate said roll in a sense tending to run up the periphery of said wheel when held in contact therewith, and roll translation guide means interconnecting said roll support means and said wheel support means and constraining said roll to follow a translational path of contact with said wheel approaching gradually and progressively closer to the axis of said wheel, said guide means comprising link means connected at one end to said roll support means and means pivotally connecting the opposite end of said link means to said wheel support means to permit swinging of said link means and of said roll about a pivotal axis substantially parallel to and offset materially from the axis of said wheel, the location of said pivotal axis relative to the axis of said wheel and the length of said link means relative to the radius of said wheel cooperatively establishing said translational path of contact as an arc intersecting the wheel periphery at an acute angle.

2. The combination defined in claim 1 wherein the pivotal connecting means comprises a lug element and a hook element releasably engageable therewith.

3. The combination defined in claim 1, wherein the diameter of the power roll is small in relation to the diameter of the wheel, and the roll is supported low to the ground in relation to the wheel axis, the drive means for said roll being reversible.

4. The combination defined in claim 1, wherein the link means comprises a link element pivotally connected to the roll supporting means to permit swinging of said link element between upraised carrying position and a lowered position for connection to the wheel support means, the connecting means element carried by the tug vehicle being mounted on the swinging end of said link element and being engageable with the connecting means element carried by the wheel support means when said link element occupies its last-mentioned position, and means in the tug vehicle operable to swing said link element between said positions.

5. The combination defined in claim 1, wherein the tug vehicle has ground-engaging traction means, and power transfer means drivingly connecting the roll drive means thereto for producing ground movement of said tug vehicle substantially equal to the peripheral velocity of the power roll.

6. In combination, an airplane having a dual wheel landing gear, a tug vehicle operable to effect ground movement of said airplane, said tug vehicle including a pair of power friction rolls, means supporting said power rolls on one end of said tug vehicle to rotate about a common axis extending substantially horizontally and transversely of said tug vehicle and in positions spaced apart along said rotational axis enabling such rolls to be placed in rolling contact with the peripheries of the respective landing wheels by approach of the tug vehicle to such wheels in the general plane of such wheels, power means operable to rotate said rolls in a sense tending to run up said wheel peripheries when held in contact therewith, said power means including differential speed control means operable to rotate said rolls selectively at equal speeds and at varying differential speeds, and roll translation guide means interconnecting said roll support means and said landing gear and constraining said rolls to run up said wheel peripheries to follow a translational path of contact therewith approaching gradually and progressively closer to the landing wheel axis, whereby the friction force of said rolls against said wheel peripheries, hence the traction of said rolls on said wheels is progressively increased until such traction becomes sufficient to rotate said wheels and thereby move the airplane, said guide means comprising link means connected at one end to said roll support, and means pivotally connecting the opposite end of said link means to said landing gear to permit swinging of said link means, hence of said rolls relative to said landing gear about an axis substantially parallel to and offset materially from the axis of said landing wheels, the location of said pivot axis relative to the landing wheel axis and the length of said link means relative to the wheel radius cooperatively establishing said translational path of contact as an arc intersecting said landing wheel peripheries at an acute angle.

7. The combination defined in claim 6, wherein the tug vehicle comprises ground-engaging traction elements on opposite sides thereof, and power transfer means forming a drive connection between each of said traction elements and power roll on the same side of such vehicle, establishing the ground speeds of such traction elements substantially equal to their respective power rolls.

References Cited in the file of this patent

UNITED STATES PATENTS

| | | |
|---|---|---|
| 2,145,188 | Morris | Jan. 24, 1939 |
| 2,366,892 | Donnellan | Jan. 9, 1945 |
| 2,409,552 | Donnellan | Oct. 15, 1946 |
| 2,547,268 | Jacobi | Apr. 3, 1951 |

FOREIGN PATENTS

| | | |
|---|---|---|
| 564,745 | Germany | Nov. 22, 1932 |
| 482,057 | Great Britain | Mar. 23, 1938 |
| 576,649 | Great Britain | Apr. 12, 1946 |